(12) United States Patent
Hui

(10) Patent No.: US 6,335,632 B1
(45) Date of Patent: Jan. 1, 2002

(54) CMOS SMALL SIGNAL SWITCHABLE TERMINATOR NETWORK

(75) Inventor: David T. Hui, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/583,055

(22) Filed: May 30, 2000

(51) Int. Cl.$^7$ ........................ H03K 17/16; H03K 19/003
(52) U.S. Cl. ............................................. 326/30; 326/83
(58) Field of Search ............................. 326/30, 82, 83, 326/86, 90

(56) References Cited

U.S. PATENT DOCUMENTS

| | | | |
|---|---|---|---|
| 4,228,369 A | 10/1980 | Anantha et al. | 307/270 |
| 4,525,830 A | 7/1985 | Cohen et al. | 370/60 |
| 4,748,426 A | 5/1988 | Stewart | 333/22 R |
| 4,818,901 A | * 4/1989 | Young et al. | 326/27 |
| 4,989,202 A | 1/1991 | Soto et al. | 370/13 |
| 5,204,860 A | 4/1993 | Sparks | 370/110.1 |
| 5,387,131 A | 2/1995 | Foreman et al. | 439/620 |
| 5,493,657 A | 2/1996 | Van Brunt et al. | 395/308 |
| 5,523,704 A | 6/1996 | Lingkon So | 326/30 |
| 5,675,580 A | 10/1997 | Lyon et al. | 370/250 |
| 5,729,824 A | 3/1998 | O'Neill et al. | 455/3.1 |
| 5,850,387 A | 12/1998 | Lyon et al. | 370/250 |
| 5,917,827 A | 6/1999 | Cantwell | 370/466 |
| 5,977,797 A | 11/1999 | Gasparik | 326/86 |
| 6,127,840 A | * 10/2000 | Coteus | 326/30 |

* cited by examiner

Primary Examiner—Michael Tokar
Assistant Examiner—Daniel D. Chang
(74) Attorney, Agent, or Firm—Lynn L. Augspurger

(57) ABSTRACT

A terminator circuit for connection to a network can be fabricated and used within CMOS-SOI (complementary metal oxide semiconductor-silicon on insulator) for carrying small logic level signals for connecting data from a network's first circuit to a network's second circuit in which a network's input terminal connects a terminator circuit to the network's second circuit to act as a terminator on the data line passing data from said first circuit to said second circuit. The terminator circuit has a reference circuit coupled to a terminal circuit. The reference circuit has SOI devices back to back source coupled CMOS-SOI devices to each other for a tuned center reference voltage node, with their bodies connect to upper and lower level power supplies respectively. An upper level power source is connected to one side of the reference voltage node and a lower reference voltage power source is connected to the other side of the reference voltage node. The voltage level above the common tuned reference voltage and a lower level voltage is supplied to the terminator's corresponding input terminal circuit control nfet and pfet mirror devices whose bodies are also connected respectively to lower and upper level supply power to control each of their turn on voltages. Resistors of the reference path establish the swing voltage of the terminator as being that approximating an ideal 50 ohm split resistor terminator.

6 Claims, 4 Drawing Sheets

CM OS SMALL SIGNAL SWITCHABLE TERMINATOR NETWORK

RELATED APPLICATIONS

This application is related to the following concurrently filed application(s):

U.S. Ser. No. 09/580,290, filed May 30, 2000, entitled: CMOS Small Signal Terminator and Network, naming David T. Hui, inventor; and U.S. Ser. No. 09/593,187, filed May 30, 2000, entitled: SOI Small Signal Terminator and Network, naming David T. Hui, inventor; and U.S. Ser. No. 09/583,185, filed May 30, 2000, entitled: Method for use with a Terminator and Network, naming David T. Hui, inventor; and U.S. Ser. No. 09/580,942, filed May 30, 2000, entitled: SOI Small Signal Switchable Adjustable Terminated Hysteresis Receiver, naming David T. Hui, inventor; and U.S. Ser. No. 09/580,289, filed May 30, 2000, entitled: CMOS Small Signal Terminated Receiver, naming David T. Hui, inventor; and U.S. Ser. No. 09/583,055, filed May 30, 2000, entitled: CMOS Small Signal Switchable Terminator Network, naming David T. Hui, inventor; and U.S. Ser. No. 09/583,186, filed May 30, 2000, entitled: CMOS Small Signal Switchable Adjustable Impedence Terminator Network, naming David T. Hui, inventor; and U.S. Ser. No. 09/580,789, filed May 30, 2000, entitled: CMOS Small Signal Switchable and Adjustable Terminator Network, naming David T. Hui, inventor; and U.S. Ser. No. 09/583,188, filed May 30, 2000, entitled: CMOS Small Signal Switchable Impedence and Voltage Adjustable Terminator Network, naming David T. Hui, inventor; and U.S. Ser. No. 09/580,805, filed May 30, 2000, entitled: CMOS Small Signal Switchable Impedence and Voltage Adjustable Terminator Network and Receiver Integration, naming David T. Hui, inventor; and U.S. Ser. No. 09/580,680, filed May 30, 2000, entitled: CMOS Small Signal Switchable Impedence and Voltage Adjustable Terminator with Hysteresis Receiver Network, naming David T. Hui, inventor; And U.S. Ser. No. 09/580,802, filed May 30, 2000, entitled: CMOS Small signal Terminated Hysteresis Receiver, naming David T. Hui, inventor; and U.S. Ser. No. 09/580,943, filed May 30, 2000, entitled: SOI Small Singal Terminated Receiver, naming David T. Hui, inventor.

This related application(s) and the present application are owned by one and the same assignee, International Business Machines Corporation of Armonk, N.Y.

The descriptions set forth in these co-pending applications are hereby incorporated into the present application by this reference.

Trademarks: S/390 and IBM are registered trademarks of International Business Machines Corporation, Armonk, N.Y., U.S.A. Other names may be registered trademarks or product names of International Business Machines Corporation or other companies.

FIELD OF THE INVENTION

This invention relates to terminators which are applicable to metal oxide semiconductors on insulator (MOS-soi) with triple wells integrated circuit technology and which are particularly useful for terminator networks.

BACKGROUND

For signal interfaces between devices terminators have been used, as described for instance in U.S. Pat. No. 4,748,426: entitled "Active termination circuit for computer interface use", granted May 31, 1998 to Alexander Stewart for Rodime PLC, in an active termination circuit for a computer interface for reducing line reflection of logic signals. Such terminators have used a first and second resistor combination to permanently connect to a signal line that couples a plurality of peripheral devices to one another. The other ends of the first and second resistors are connected through a switching device to a positive voltage supply line and to logic ground, respectively. When termination of multiple devices was required, a plurality of resistor combinations were provided but on/off control of the switch in this example was achieved by one control that is located remote from the termination circuit systems. Integrated circuit interconnection structures have also used precision terminating resistors, as illustrated by U.S. Pat No. 4,228,369, granted in October, 1980 to Anantha et al. for IBM.

As will be illustrated for chip interconnection, when resistor terminators are used in thin film semiconductor integrated circuits such as those used in metal oxide semiconductors (e.g.CMOS) today, they create hot spots which cannot be adequately cooled, so such resistor terminator circuits which create hot spots cannot be used in metal oxide semiconductor applications to provide terminators for chip to chip connections on chips using IBM's new sub-micron MOS (CMOS) technologies where because of the high currents used in these networks it is difficult or impossible to meet all the cooling and reliability requirements required for commercial performance. It has become necessary to invent a solution to interfacing devices which can be used in such environments on chips, and used for terminators in networks of chips and devices where there is a need to transmit digital data therebetween without overshoot and undershoot in signal transmission between the chips and devices or systems. These connections need to operate at a faster speed, accommodating data rate speeds ranging into hundreds of Mhz and Ghz.

The creation of a terminator which particularly may be fabricated for high speed metal oxide semiconductor on insulator (MOS-soi) applications with triple wells in integrated circuits is needed.

SUMMARY OF THE INVENTION

The described invention provides the needed terminator and receiver network, and particularly a circuit which provides a well balanced threshold voltage between the logic levels, so that maximum noise tolerance between logic levels can be achieved for the receiver in a digital system.

As a result of the circuit illustrating the preferred embodiment of the invention, a terminator network which is well adapted for MOS manufacture is provided that can match the characteristic impedance of the line to which the terminator network is connected. This invention relates to terminator network which is useful for fast transmission of digital data, eliminating or reducing overshoot and undershoot in signal transmission between chips and between systems, in serial links and data buses, for minimizing ringing and similar noise problems, for providing electrostatic discharge (ESD) protection, particularly in high speed metal oxide semiconductor (MOS) integrated circuit applications, and mixed vender technology interface communications. The circuit meets the demand for fast data transmission has push the data rate into hundreds of Mhz and Ghz. It is advantages for reducing the signal swing so that the signal reach its desired voltage levels for digital ones or zeros defining voltage levels faster with lower power and with less noise generation at the high digital transmission speeds. It operates in the multiple hundred MHz and Ghz ranges.

The circuit provides a terminator and receiver network which is fast and suitable for small signal swings and may also be manufactured for coupling cups with mixed technologies for high speed communication. The network is particularly adapted for MOS and SOI-MOS circuits, providing a network that can match the characteristic impedance of the transmission line. The new terminator network has low current flow and low power consumption. The terminator network provides electrostatic discharge protection for the chipset at the input of an attached circuit. Also, the circuit allows switching into high impedance so that a the driver of a coupled circuit can take control of the communication line and drive out for the bi-directional data buses that are necessary in computer systems today.

In providing the circuit described, the user able to turn off all currents to support standard CMOS leakage tests so that chips with defects can be found quickly and easily in manufacture and assembly of chipsets.

The receiver in the present circuit can properly receive small signals, and it also has balanced noise tolerance between logic levels. ESD protection is provided at the input of the circuit.

These and other improvements are set forth in the following detailed description. For a better understanding of the invention with advantages and features, refer to the description and to the drawings.

The following detailed description explains the preferred embodiments of the invention, together with advantages and features, by way of example with reference to the drawings.

DETAILED DESCRIPTION OF THE INVENTION

Figure 1:
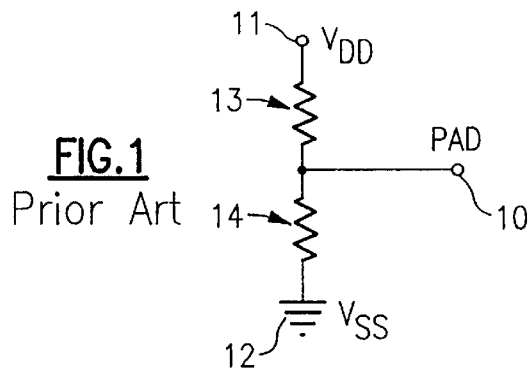
FIG. 1 illustrates the prior art Resistor Terminator Network.

Before turning to the preferred embodiment, FIG. 1 illustrated the prior art which can be reviewed in order to appreciate the advance made with the preferred embodiment. Split resistor terminators as shown in FIG. 1 in the prior art provided a circuit where a resistor 13 is connected to a first node 11 to an upper level power supply VDD and the other end of the resistor 13 is connected to the a second node 10 and is also connected in series to a second resistor 14 of the circuit. The other end of the second resistor 14 is then connected to a node 12 connected to the lower level power supply VSS. The value of the first and second resistors are set so that first node 10 has a bias voltage equal to the center of the incoming signal swing and the parallel combination of the resistors matches the characteristic impedance Z0 of the transmission line to which the resistor terminator circuit is connected, so that no reflections will occur and a clean signal can be obtained for the upper level 1 and lower level zero digital signals of the circuit to which the resistor terminator circuit is connected.

Figure 2:
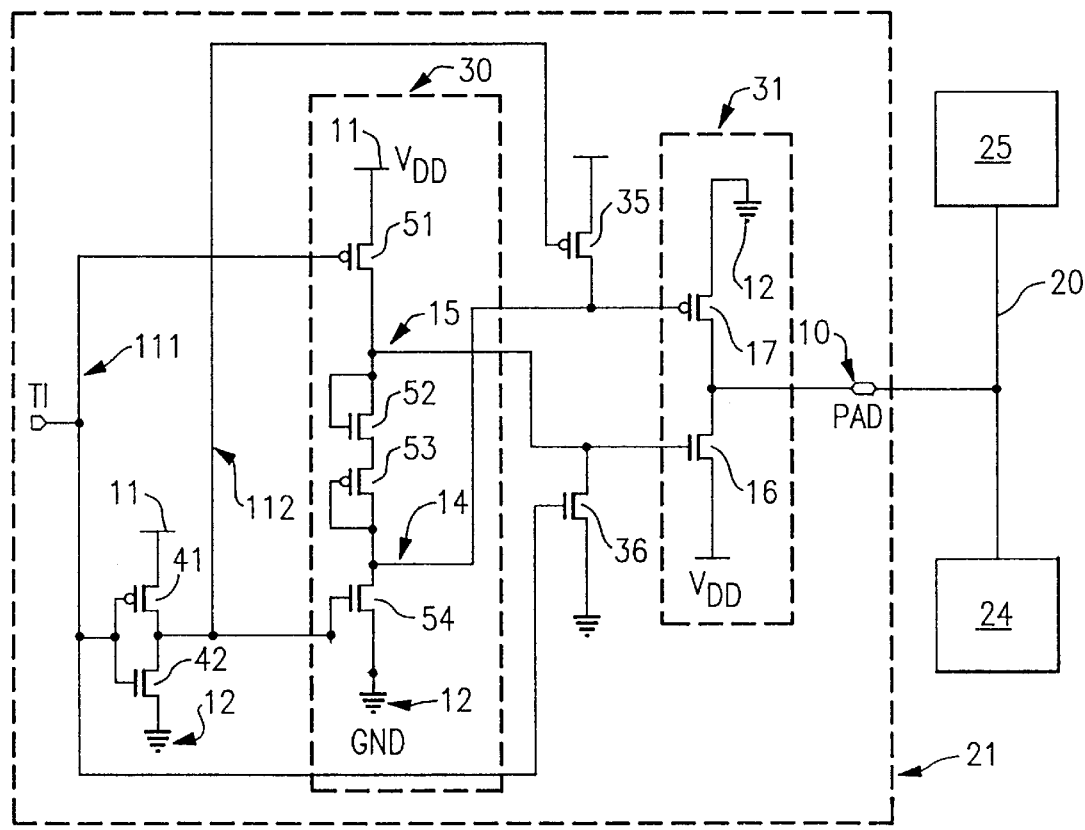
FIG. 2 depicts the preferred embodiment of a circuit illustrating the invention.

The circuit incorporating the invention in its preferred embodiment will be described with reference herein to FIGS. 2 to FIG. 6 of the drawings. FIG. 2 shows a communication network 20 for an interface carrying signals from a driving first circuit 25 to a driven second circuit 24 or input circuit. An terminator circuit input terminal 10 connects the terminator circuit 21 to the input circuit 24 on the transmission line to which the resistor terminator circuit is connected. Those skilled in the art will appreciate that the circuit incorporating the invention can be used in an environment in which that driving first circuit 25 may be operating at a different voltages then the second circuit 24. Generally, the terminating circuit 21 and the second circuit 24 will be constructed very close together physically in the same electronic system, and may be on the same chip, while the driving first circuit 25 can communicate over a communication network 20 which may be remotely located in the same electronic system or even external to the electronic system in which the terminating circuit and the illustrated driven second circuit 24 are located. It is preferred that the electronic systems in which the circuits 21, 25 and 24 are located are digital systems such as computer systems, and the communication network 20 may be connecting different components such as different processors, memory buses or data links and even may be connecting different electronic components of two computer systems or other electronic systems which have a need to communicate data between them over a communication network.

In the preferred embodiment, the terminator circuit 21 is illustrated in FIG. 2 as comprising a reference circuit 30 and an input circuit 31. The reference circuit 30 generates two reference voltages on a first node 14 and second node 15. These two voltages can be produce independently on separate paths or on a single path having series connected devices as shown in FIG. 2. FIG. 2 shows as a prefer embodiment the reference path as series connected devices. The source of the pfet 51 is connected to the upper level power supply 11 and the drain of pfet 51 is connected to the second node 15 of the referenced path. From the second node 15 the pfet 51 is connected to the gate and drain of a reference nfet 52. The source of reference nfet 52 is connected to a reference node 100. The reference circuit 30 is connected to the input circuit 31 having a pair of mirror transistors, a pfet 53 and an nfet 54. Reference node 100 then connected to the source of a input circuit pfet 53. The gate of the input circuit pfet 53 is tied to the drain of the input circuit mirror pfet 53 and both are connected to a first input circuit node 14. The first input circuit node 14 is connected to the drain of an input circuit nfet 54 and the source of nfet 54 is connected to the lower level power supply 12, which may be ground in the illustrated case.

The gate of the reference circuit pfet 51 is connected to a node 111 which is also connected a terminator inhibit control circuit having a control nfet 36. This reference circuit pfet 51 is connected to the gate of the control nfet 36 and to the on chip input (TI) terminal of the terminator inhibit control, which is also connected to the input of an inverter which is made up of inverter circuit pfet 41 and inverter circuit nfet 42. The output of the inverter circuit is connected to a node 112 and is also connected to the gate of nfet 54 and the gate of pfet 35. The source of pfet 35 is connected to node 11 or Vdd, and the drain is connected to node 14. The source of nfet 36 is connected to node 12 or gnd and its drain connected to node 15.

Node 15 is then connected to the gate of nfet 16. Node 14 is connected to the gate of pfet 17. The sources of nfet 16 and pfet 17 are tie together to the input terminal 10 or PAD, then it is connected to net 20, where it then connects to the driving circuit 25 communication line.

In the operation of this circuit using the invention the terminator network can be disabled with a control signal TI equal to a logic level "1", and enabled with a logic level "0". When TI is at a "1" logic voltage level high, node 111 is at VDD voltage and node 112 is at gnd. At this time, the pfet 51 and nfet 54 are not conducting because of their gate voltages, and nfet 36 conducts and pulls node 15 to gnd, while pfet 35 conducts and pulls node 14 to vdd. This also turns off pfet 17 and nfet 16 respectively. This operation causes the terminator network to now be "OFF" and in a non-conduction mode. At this point, the driver can then be turned on to send out the data over the communication line, for example, or for leakage test.

When the control signal TI has a logic level '0', pfet 51 and nfet 54 turns on and pfet 35 and nfet 36 are now 'off'.

It will be noted that an important a feature of circuit in this invention is that tuning node 100 is tuned to a voltage level equal to the center of the incoming voltage swing between the high level logic voltage value '1' and the low level logic voltage value '0' voltage levels. This center of the incoming voltage swing or center voltage will be called Vcenter. This Vcenter will set node 15 at a voltage which is a tuned terminal voltage vt above the Vcenter and node 14 at a voltage which is a tuned terminal voltage vt below Vcenter. When the terminal 10 is driven to rise above the Vcenter, the gate to source voltage in pfet 17 is driven to below the tuned terminal voltage vt and more, and this cate to source voltage change in pfet 17 starts to turn-on and conduct current to the lower power level 12 or ground, whereas the gate to source of the nfet 16 is below the tuned terminal voltage vt and therefore no conduction occurs and no current will flow in nfet 16 to 11 or VDD. On the other hand when terminal 10 fall below Vcenter, the gate to source voltage of nfet 16 is above tuned terminal voltage vt and turns on to conduct current to 11 or the top power supply VDD. Now the pfet 15 is off since the gate to source voltage is above tuned terminal voltage vt.

There is a special advantage to the use of the preferred embodiment with the back to back gate to drain connected configuration of nfet 52 and pfet 53 in the reference circuit. This configuration tracks to the corresponding input circuit mirror like nfet 16 and pfet 17 transistors. This controls each of the mirror nfet 16 and pfet 17 transistors to turn on voltage levels and so no excessive through current in the nfet 16 and the pfet 17 will occur. Furthermore, since at logic states one, the input devices 16 or 17 will be off, low power is used.

The results of the small signal terminator network as constructed according to the present invention is shown in FIGS. 3 through 6. The center of the input voltage swing is at vdd/2 for this illustration. Other input voltage swings can be designed as well by changing the device size of pfet 51 and nfet 54 in the reference circuit.

Figure 3:
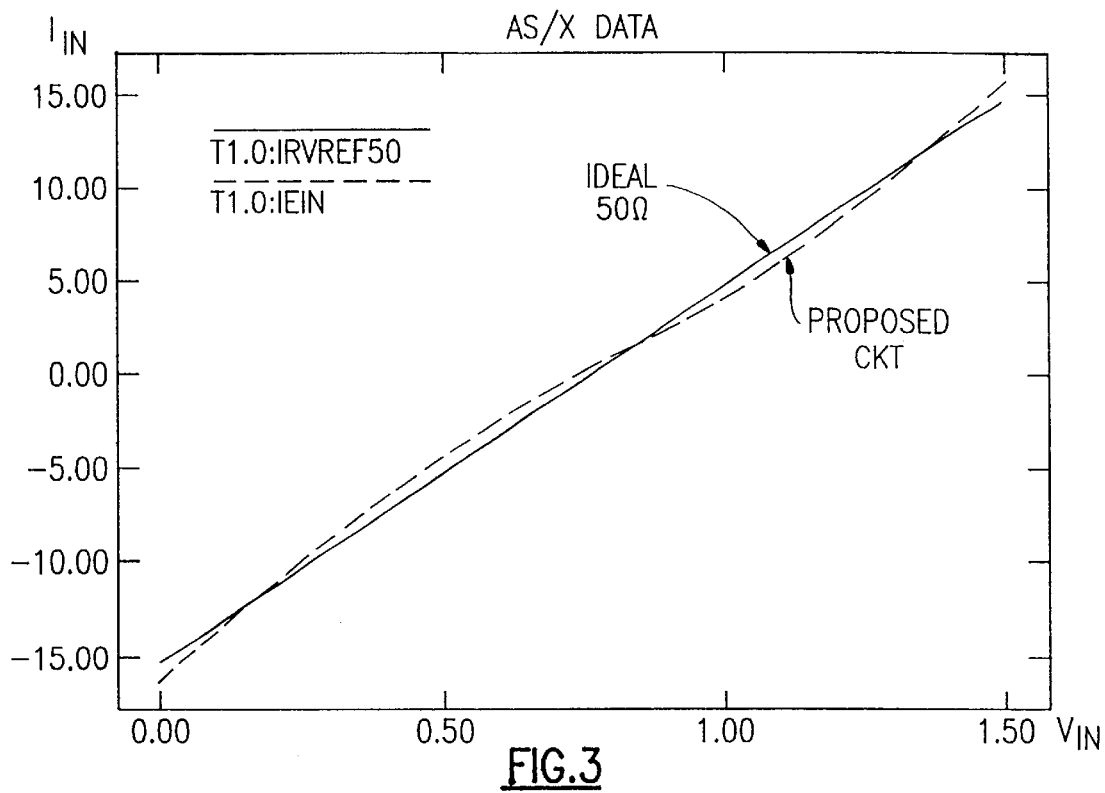
FIG. 3 is a graph having two curves depicting input currents as a function of the input voltages for the CMOS small signal terminator network constructed according to the present invention and a standard ideal 50 ohm terminator.

FIG. 3 is a graph having two curves depicting input currents as a function of the input voltages for the CMOS small signal terminator network constructed according to the present invention and a standard ideal 50 ohm split resistor terminator. As shown the impedance of the present invention can be matched very closely to the ideal resistor terminator.

Figure 4:
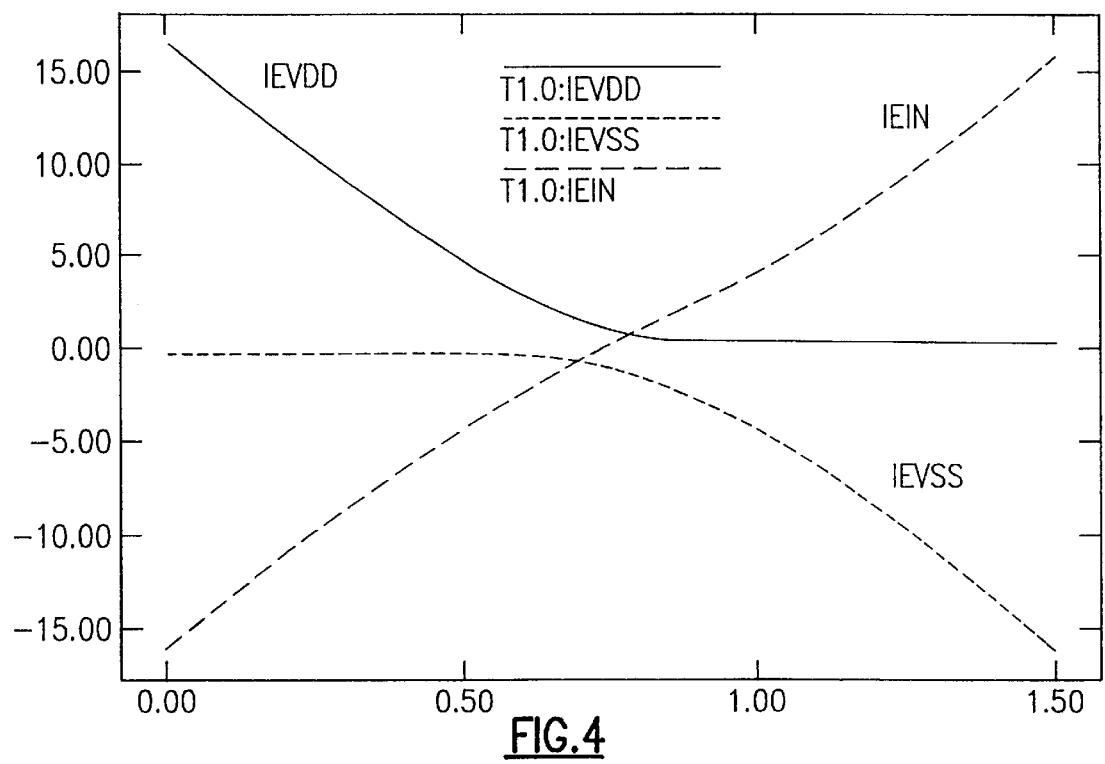
FIG. 4 is a graph having curves depicting the input current as a function of the input voltages for the CMOS small signal terminator constructed according to the present invention and curves of the upper and lower power supply currents as a function of the input voltage.

FIG. 4 is a graph having curves depicting the input current as a function of the input voltages for the CMOS small signal terminator constructed according to the present invention and curves of the upper and lower power supply currents as a function of the input voltage. The input current at the upper half cycle of the input voltage is directed to flow into the lower power supply, and current of the lower half cycle is directed to flow out from the upper power supply. Other than the bias current, there are no through current from the upper to the lower power supplies.

Figure 5:
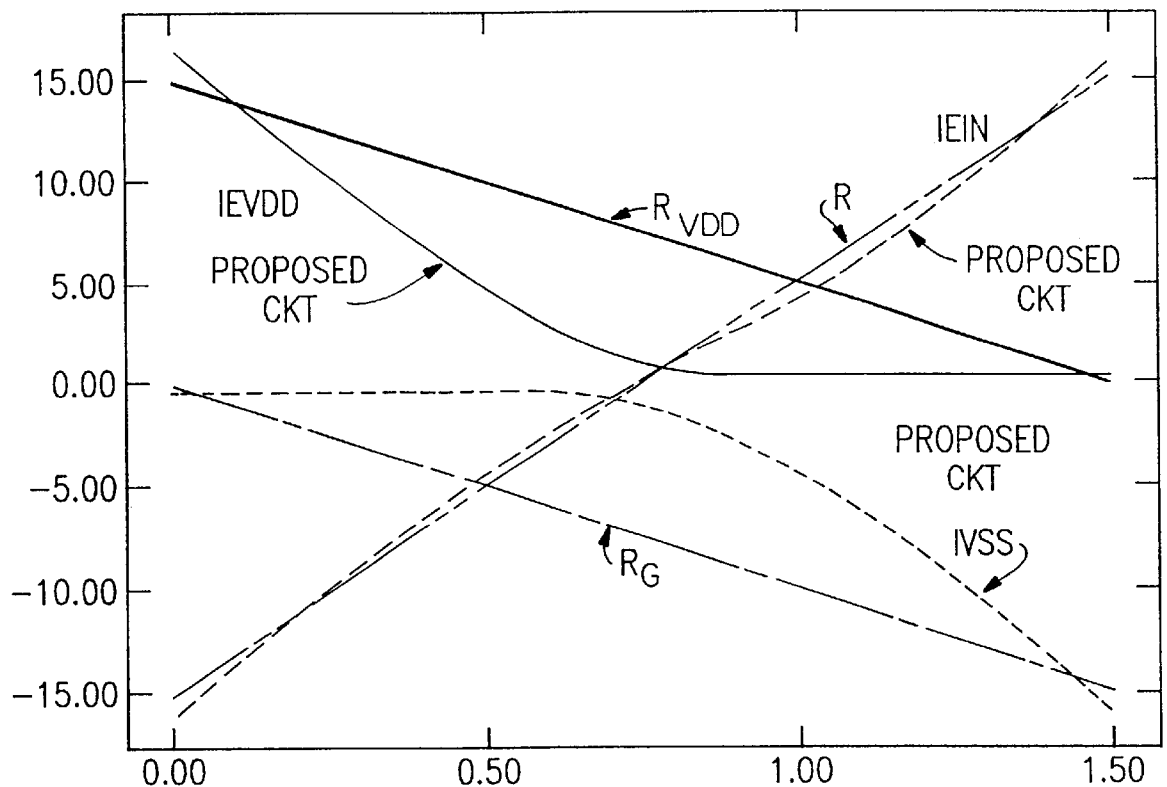
FIG. 5 is a graph having curves depicting the input current as a function of the input voltages for the CMOS small signal terminator constructed according to the present invention and curves of its currents to the upper and lower power supplies as a function of the input voltages. This graph also has curves of the corresponding input current, and the currents to the upper and lower power supplies for an split resistor terminator as in the prior art.

FIG. 5 is a graph having curves depicting the input current as a function of the input voltages for the CMOS small signal terminator constructed according to the present invention and curves of its currents to the upper and lower power supplies as a function of the input voltages. This Figure also has curves of the corresponding input current, and the currents to the upper and lower power supplies for an split resistor terminator as in the prior art. This shows the large difference in the power supply currents at and near the center of the swing between the prior art and the present invention.

Figure 6:
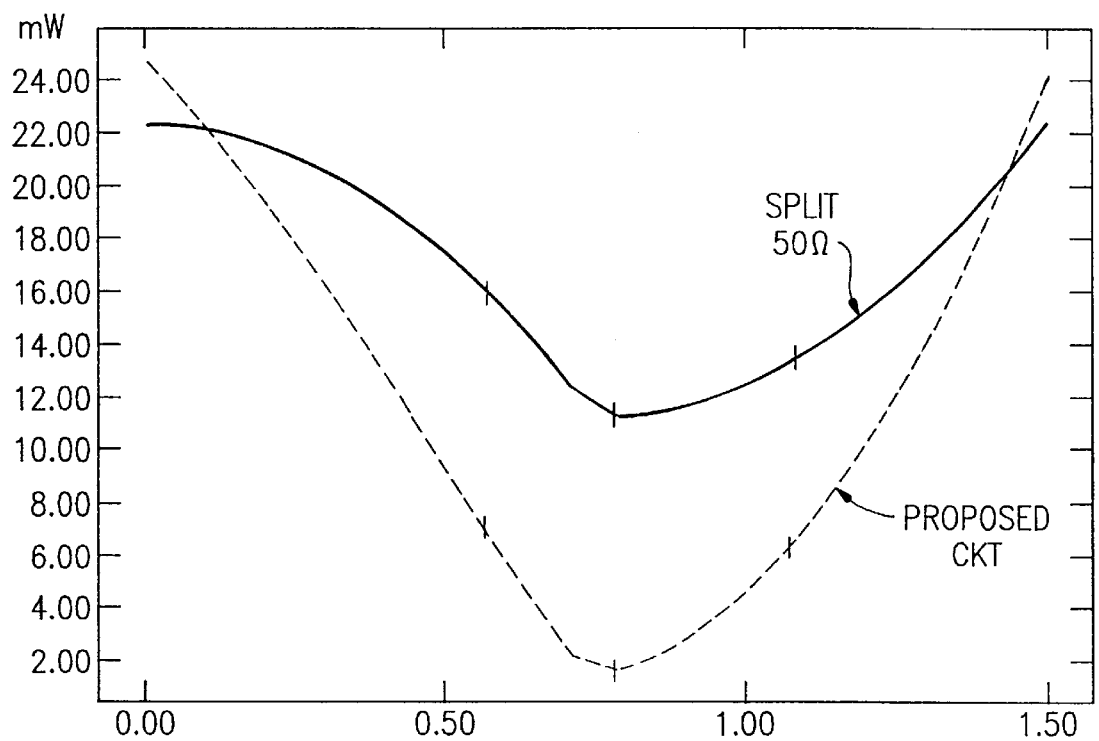
FIG. 6 is a graph having curves of the power consumption as a function of input voltages for the CMOS small signal terminator constructed according to the present invention and the power consumption of a split resistor as in prior art.

FIG. 6 is a graph having curves of the power consumption as a function of input voltages for the CMOS small signal terminator constructed according to the present invention and the power consumption of a split resistor as in prior art. This shows the power which the prior art consumes is a lot more than the present invention for small signal applications.

In terms of ESD protection, when the circuit described in the present invention is powered up it has a low resistance path to one of the power supplies depending on the input voltage level. If the input terminal voltage move more then about 0.7 volts outside the upper or lower power supplies, the parasitic diodes and the parasitic bipolar transistor in the pfet 15 and nfet 16 also turn on to further reduce the input impedance to improve the performance of the ESD protection. This performance is so effective that an additional ESD protection device may not be necessary to protect this circuit or to protect the input/output circuit connected to this terminal. The parasitic elements in pfet 15 and nfet 16 are active even when the devices are not powered which provides significant ESD protection during handing of the device. The implementation shown result in a clean signal on communication network 20 with no or minimum reflection and noise generated in the system and one in which a fast, solid, clean and reliable small swing can be obtained for a point to point nets as well as for obtaining a cleaner multiple drop net. This implementation provides fast transmission of data at speeds in the hundreds of MHz and Ghz ranges and signals with much lower power consumption as compared to split resistive termination networks. This also provided a way for a terminal input signal TI to disable the termination function allowing in case of bi-directional buses a turn around and the sending of data freely without a near end termination which can limit the signal swing and increase power. The circuit provided by FIG. 2 can also support a standard CMOS leakage test by the disable function, reducing the cost of testing to eliminate process defects.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A CMOS terminator circuit for connection to a network carrying small logic level signals from a network's first circuit to a network's second circuit in which a network's input terminal connects the terminator circuit to the network's second circuit to act as a terminator on a data line passing data from said first circuit to said second circuit, comprising:

a terminator reference circuit (30) coupled to a terminator input circuit (31) in said terminator, said terminator input circuit being coupled to said network input terminal for connecting the network's first circuit to the network's second circuit, said terminator reference circuit (30) generating two reference voltage levels, one first level voltage for a first node (14) and and a second level voltage for a second node of said terminator reference circuit, the first voltage level of said terminator reference circuit being at a level above a tuned reference voltage and the second voltage level of said terminator reference circuit being at a level below said tuned reference voltage, said the first voltage level and said second voltage level being supplied on separate paths from said first and second nodes respectively to a terminator input circuit (31) having a pair of coupled mirror devices for control of the logic level provided at said network's input terminal which connects said terminator circuit to the network's second circuit to act as a terminator on the data line passing data from said first circuit to said second circuit, and said terminator reference circuit (30) including a control test circuit enabling a driver for said network's first circuit to be turned on to send out the data over the communication line, or for leakage test.

2. The CMOS terminator circuit for connection to the network according to claim 1, wherein said tuned reference voltage is tuned to a voltage level equal to the center of an incoming voltage swing between the logic '1' and '0' voltage levels between an upper level power supply and a lower level power supply.

3. The CMOS terminator circuit for connection to the network according to claim 1, wherein said second node (15) having the voltage level above the tuned voltage reference level is connected to the gate of a terminator input circuit nfet (16) device and said first node (14) having the voltage level below the tuned voltage reference level is connected to the gate of a terminator input circuit device pfet (17) whereupon, after arriving at the mirrored devices of the terminator input circuit (21), the voltages on both sides of the tuned reference voltages are combined by the coupled mirrored devices of said terminator input circuit to control value of the signal of the terminator pad (10) with the sources of the terminator input circuit nfet (16) device and pfet (17) device coupled together and to the network input terminal, whereby the terminator circuit is connected to the network to connect to the first circuit (25) to the network driven second circuit (24).

4. The CMOS terminator circuit for connection to the network according to claim 3 wherein said two reference voltages are supplied by a single reference path which comprises an upper level power supply (11) which is coupled to said second node (15), and from second node (15) said voltage reference path is connected to the gate and drain of a reference circuit nfet (52) device, and the source of said reference circuit nfet (52) device is connected to a tuned reference voltage node which is then connected to the source of a reference circuit pfet (53) device, and wherein the gate of the reference circuit pfet (53) device is tied to its drain and both the source and gate of the reference circuit pfet (53) device are connected to the first node (14) which is connected to the lower level power supply (12).

5. The terminator circuit for connection to the network according to claim 3 wherein said reference circuit has a reference circuit nfet and a reference circuit pfet connect back to back gate to drain to track corresponding mirror devices of said terminator input devices to control each of their turn on voltages, so that no excessive through current in the terminator input circuit nfet (16) and the terminator input circuit pfet (17) will occur, and wherein, at this logic state, one of the mirror devices will be off and reduce the power requirements of the terminator network.

6. The terminator circuit according to claim 5 wherein parasitic diodes and a parasitic bipolar transistor in the pfet (17) and nfet (16) mirror devices are active even when the mirror devices are not powered to provide ESD (electrostatic discharge) protection during handing of the device.

* * * * *

UNITED STATES PATENT AND TRADEMARK OFFICE
CERTIFICATE OF CORRECTION

PATENT NO.     : 6,335,632 B1
DATED          : January 1, 2002
INVENTOR(S)    : Hui It is certified that error appears in the above-identified patent and that said Letters Patent is hereby corrected as shown below:

<u>Column 1,</u>
Line 1, Title reads "CM OS SMALL SIGNAL SWITCHABLE" should read
-- CMOS SMALL SIGNAL SWITCHABLE --.

Signed and Sealed this

Tenth Day of June, 2003

JAMES E. ROGAN
*Director of the United States Patent and Trademark Office*